United States Patent
Wolfe (10) Patent No.: US 8,701,991 B2
(45) Date of Patent: *Apr. 22, 2014

(54) SYSTEM AND METHOD FOR PREVENTING FRAUD BY GENERATING NEW PREPAID GIFT ACCOUNTS

(71) Applicant: GiftCodes.com, LLC, Pittsburgh, PA (US)

(72) Inventor: Jason Wolfe, Sewickley, PA (US)

(73) Assignee: GiftCodes.com, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,630

(22) Filed: Sep. 10, 2013

(65) Prior Publication Data
US 2014/0012752 A1  Jan. 9, 2014

Related U.S. Application Data

(63) Continuation of application No. 13/442,554, filed on Apr. 9, 2012, now Pat. No. 8,528,814, which is a continuation of application No. 12/702,600, filed on Feb. 9, 2010, now Pat. No. 8,152,061, which is a continuation-in-part of application No. 12/573,042, filed on Oct. 2, 2009, now Pat. No. 8,152,060.

(60) Provisional application No. 61/207,125, filed on Feb. 9, 2009, provisional application No. 61/211,394, filed on Mar. 28, 2009.

(51) Int. Cl.
G06K 5/00 (2006.01)

(52) U.S. Cl.
USPC .......................... 235/380; 235/381; 235/382.5

(58) Field of Classification Search
USPC ....................... 235/380, 381, 382.5
See application file for complete search history.

(56) References Cited

U.S. PATENT DOCUMENTS

| | | | |
|---|---|---|---|
| 7,424,452 B2 | 9/2008 | Feilbogen et al. | |
| 7,494,048 B2 | 2/2009 | Gusler et al. | |
| 7,527,192 B1 | 5/2009 | Chaskin et al. | |
| 7,624,921 B1 | 12/2009 | Beck et al. | |
| 8,152,060 B2 * | 4/2012 | Wolfe et al. | 235/382.5 |

(Continued)

FOREIGN PATENT DOCUMENTS

WO  WO 2008/013945  1/2008

OTHER PUBLICATIONS

U.S. Appl. No. 13/688,923, filed Nov. 5, 2012, Jason Wolfe.
U.S. Appl. No. 13/688,971, filed Nov. 5, 2012, Jason Wolfe.

(Continued)

*Primary Examiner* — Kristy A Haupt (57) ABSTRACT

Systems, methods, and computer-readable media for preventing fraud when exchanging prepaid gift accounts. The system identifies a first prepaid gift account associated with a first prepaid gift. The system then presents an owner of the first prepaid gift with an offer to purchase the first prepaid gift account for an offer amount. Next, the system receives from the owner an acceptance of the offer. Based on the acceptance, the system provides payment to the owner for the first prepaid gift account, generates a second prepaid gift account for a second prepaid gift, transfers at least a portion of funds from the first prepaid gift account to the second prepaid gift account, deactivates the first prepaid gift account, and offers the second prepaid gift account for resale as a new prepaid gift to a person other than the owner.

20 Claims, 5 Drawing Sheets

(56) References Cited

U.S. PATENT DOCUMENTS

| | | | |
|---|---|---|---|
| 8,152,061 B2* | 4/2012 | Wolfe et al. | 235/382.5 |
| 8,229,851 B2 | 7/2012 | Doran et al. | |
| 8,528,814 B2* | 9/2013 | Wolfe | 235/380 |
| 2001/0007098 A1 | 7/2001 | Hinrichs et al. | |
| 2003/0004828 A1 | 1/2003 | Epstein | |
| 2004/0078325 A1 | 4/2004 | O'Connor | |
| 2004/0219971 A1 | 11/2004 | Ciancio et al. | |
| 2005/0171902 A1 | 8/2005 | Nguyen | |
| 2005/0228717 A1 | 10/2005 | Gusler et al. | |
| 2006/0037835 A1 | 2/2006 | Doran et al. | |
| 2006/0190337 A1 | 8/2006 | Ayers et al. | |
| 2007/0055568 A1 | 3/2007 | Osborne | |
| 2007/0075134 A1 | 4/2007 | Perlow et al. | |
| 2007/0156513 A1 | 7/2007 | Mastrianni et al. | |
| 2007/0205269 A1 | 9/2007 | Lindon | |
| 2007/0272736 A1 | 11/2007 | Brooks et al. | |
| 2007/0284433 A1 | 12/2007 | Domenica et al. | |
| 2008/0162271 A1 | 7/2008 | Benjamin | |
| 2008/0162299 A1 | 7/2008 | Gusler et al. | |
| 2008/0294518 A1 | 11/2008 | Weiss et al. | |
| 2008/0296368 A1 | 12/2008 | Newsom | |
| 2009/0171773 A1 | 7/2009 | Shastry | |
| 2009/0265269 A1 | 10/2009 | Stoecker | |
| 2010/0010888 A1 | 1/2010 | Maertz | |
| 2010/0057580 A1 | 3/2010 | Raghunathan | |
| 2010/0070290 A1 | 3/2010 | Marturana et al. | |
| 2010/0280921 A1 | 11/2010 | Stone et al. | |
| 2010/0299194 A1 | 11/2010 | Snyder et al. | |
| 2011/0106698 A1 | 5/2011 | Isaacson et al. | |
| 2011/0178924 A1 | 7/2011 | Briscoe et al. | |
| 2011/0213674 A2 | 9/2011 | Shpun et al. | |
| 2012/0016725 A1 | 1/2012 | Kraft et al. | |

OTHER PUBLICATIONS

Swapagift.com Expands its "Cash for your Card" program. Retrieved from http://www.prweb.com/releases/2003/12/prweb96305.htm on Nov. 9, 2011.

Swapathing, Inc. Announced The Internet's First Online Gift Card Exchange. Retrieved from http://www.prweb.com/releases/2003/10/prweb83758.htm on Nov. 9, 2011.

Cash for your card now! Retrieved from www.swapagift.com on Nov. 9, 2011.

"What is SwapAGift.com?" retrieved from http://www.swapagift.com/ on Oct. 25, 2011.

Offenberg, "Markets: Gift Cards"; Journal of Economic Perspectives vol. 21, No. 2, Spring 2007 [Retrieved from the Internet] <URL: http://myweb.lmu.edu/jpate/JEP__2007.pdf>. pp. 227-238.

* cited by examiner

SYSTEM AND METHOD FOR PREVENTING FRAUD BY GENERATING NEW PREPAID GIFT ACCOUNTS

PRIORITY CLAIM

The present application is a continuation of U.S. patent application Ser. No. 13/442,554, filed Apr. 4, 2012, which is a continuation-in-part of U.S. application Ser. No. 12/702,600, filed Feb. 9, 2010 now U.S. Pat. No. 8,152,061, issued on Apr. 10, 2012, which is a continuation-in-part of U.S. application Ser. No. 12/573,042, filed Oct. 2, 2009, now U.S. Pat. No. 8,152,060, issued on Apr. 10, 2012, which claim priority to Provisional Application 61/207,125, filed Feb. 9, 2009, and Provisional Application 61/211,394, filed Mar. 28, 2009, all of which are herein incorporated by reference in their entirety.

RELATED APPLICATIONS

This Application is related to U.S. application Ser. Nos. 12/702,610, 12/702,623, and 12/701,711, filed Feb. 9, 2010.

BACKGROUND

1. Technical Field

The present disclosure relates to prepaid gift account fraud prevention and more specifically to preventing fraud when exchanging prepaid gift accounts by closing a first prepaid gift account of a first prepaid gift and generating a second prepaid gift account for a second prepaid gift that is funded with at least a portion of the funds from the first prepaid gift account.

2. Introduction

Prepaid gift accounts are widely used as gifts for birthdays, Christmas, and other holidays. Prepaid gift accounts can be issued as physical cards. Prepaid gift accounts can also be issued as an account number delivered to the prepaid account holder via text message, email or as data displayed on an application residing on a mobile computing device such as a mobile telecommunications device, a mobile computing device such as a laptop computer, smart phone or tablet computer or a non-mobile computer device such as a personal computer system, personal gaming system or satellite or cable television system. Prepaid gift accounts can be closed loop, meaning that the value represented by the prepaid gift account is a valid form of payment at a closed set of retailers. For example, an OUTBACK STEAKHOUSE® prepaid gift account is only redeemable at OUTBACK STEAKHOUSE® and not at PLANET HOLLYWOOD® or TARGET®. Some closed loop prepaid gift accounts are valid at a family of closely related or commonly owned merchants. For example, a DARDEN RESTAURANTS prepaid gift account is valid at RED LOBSTER® and OLIVE GARDEN®; similarly, a local mall prepaid gift account is valid at tenant merchants in the local mall. By contrast, prepaid gift accounts can also be open loop, such as VISA® or MASTERCARD® debit cards, which serve as a valid form of payment at virtually any retailer nationwide.

While prepaid gift accounts are popular alternatives to cash and merchandise gifts, which may not interest the recipient, such prepaid gift accounts typically have various limitations which reduce their utility and appeal to the recipient. For example, the recipient may have trouble redeeming the prepaid gift account due to geographic limitations associated with the prepaid gift account. Many times, the prepaid gift account is tied to a particular merchant which the recipient may dislike, greatly reducing the value of the prepaid gift account to the recipient. Additionally, some merchants issue prepaid gift accounts with significant restrictions, complex fees, and/or expiration dates. According to one estimate, consumers purchase about $80 billion worth of prepaid gift accounts annually in the U.S., and roughly 10%, or $8 billion, of that amount goes unredeemed. Consumers waste these unredeemed funds and do not benefit from the full value of the prepaid gift account. Further, if these funds are not spent, they can escheat to the state.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can provide a secure and efficient mechanism for prepaid gift account fraud prevention. More specifically, these approaches can prevent fraud when users exchange prepaid gift accounts by closing a first prepaid gift account for a first prepaid gift and generating a second prepaid gift account for a second prepaid gift that is funded with at least a portion of the funds from the first prepaid gift account. Here, users can securely exchange prepaid gift accounts with great flexibility.

Disclosed are systems, methods, and computer-readable storage media for preventing fraud when exchanging prepaid gift accounts. The system identifies a first prepaid gift account associated with a first prepaid gift. The system then presents an owner of the first prepaid gift with an offer to purchase the prepaid gift account associated with the first prepaid gift for an offer amount. Next, the system receives from the owner an acceptance of the offer. Based on the acceptance, the system provides payment to the owner for the first prepaid gift account associated with the first prepaid gift, generates a second prepaid gift account for a second prepaid gift, transfers at least a portion of funds from the first prepaid gift account associated with the first prepaid gift to the second prepaid gift account, deactivates the first prepaid gift account associated with the first prepaid gift, and offers the second prepaid gift account for resale as a new prepaid gift to a person other than the owner. In one embodiment, the system receives a counteroffer from the owner and, based on the counteroffer, the system provides payment to the owner for the first prepaid gift account associated with the first prepaid gift, generates a second prepaid gift account for a second prepaid gift, transfers at least some of the funds from the first prepaid gift account associated with the first prepaid gift to the second prepaid gift account, deactivates the first prepaid gift account associated with the first prepaid gift, and offers the second prepaid gift account for resale as a new prepaid gift to a person other than the owner. The system could also offer a new prepaid gift account to the owner as payment as well.

The offer to purchase the prepaid gift account can be open or time-limited and conditioned upon a resale of a different prepaid gift account. The offer amount can be based on a resale velocity of prepaid gift accounts of a similar type as the prepaid gift account, inventory levels, and/or any other relevant business metrics. The payment can include a check, a payment of a bill or debt of the owner of the prepaid gift account, loading an amount to a new or existing credit, a debit card or prepaid gift, a deposit into an existing or new bank account, cash, etc. Further, the payment can be provided as value added to an open and/or closed loop prepaid gift account. The portion of funds transferred from the first prepaid gift account associated with the first prepaid gift to the second prepaid gift account can be the full portion of funds in the first prepaid gift account or any amount of the funds in the first prepaid gift account. The funds transferred to the second prepaid gift account can also come from a separate source, such as a third prepaid gift account, rather than the first prepaid gift account.

The system deactivates the first prepaid gift account associated with the first prepaid gift to prevent fraud and protect the parties involved in the exchange and/or any party having an interest in the transaction. The system can deactivate the first prepaid gift account by closing the first prepaid gift account, withdrawing the funds from the first prepaid gift account, suspending the first prepaid gift account, implementing prepaid gift account restrictions, etc. The system can check that the owner of the first prepaid gift account is not engaged in fraud with the first prepaid gift account and gathering and verifying personal information, such as an address, social security number, driver's license number, credit card number and credit card account information of the owner of the first prepaid gift account. The information used to identify the first prepaid gift account and check for fraud can be provided by, or obtained from, a user, a device, a merchant, a file, a program, a prepaid gift account issued as a physical card or as an account number, a network, etc. For example, the system can require the user to provide user and/or prepaid gift account identification information. The system can obtain information identifying the prepaid gift account from a physical card associated with a prepaid gift account. For example, the prepaid gift account owner can swipe a physical card associated with a prepaid gift through a physical card reader so the system can read the information identifying the prepaid gift account.

The system can divide the first prepaid gift account associated with the first prepaid gift into multiple prepaid gift accounts. For example, the system can generate new prepaid gift accounts for multiple, new prepaid gifts, transfer funds from the first prepaid gift account associated with the first prepaid gift to the new prepaid gift accounts, deactivate the first prepaid gift account associated with the first prepaid gift, and offer the new prepaid gift accounts for resale as new prepaid gifts. The system can also combine multiple prepaid gift accounts of prepaid gifts, generate a new, larger prepaid gift account for the prepaid gifts, and deactivate the multiple prepaid gift accounts.

The new prepaid gift can be closed loop or open loop and issued as a physical card or as an account number delivered to the prepaid account holder via text message, email or as data displayed on an application residing on a mobile computing device such as a mobile telecommunications device, a mobile computing device such as a laptop computer, smart phone or tablet computer or a non-mobile computer device such as a personal computer system, personal gaming system or satellite or cable television system.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
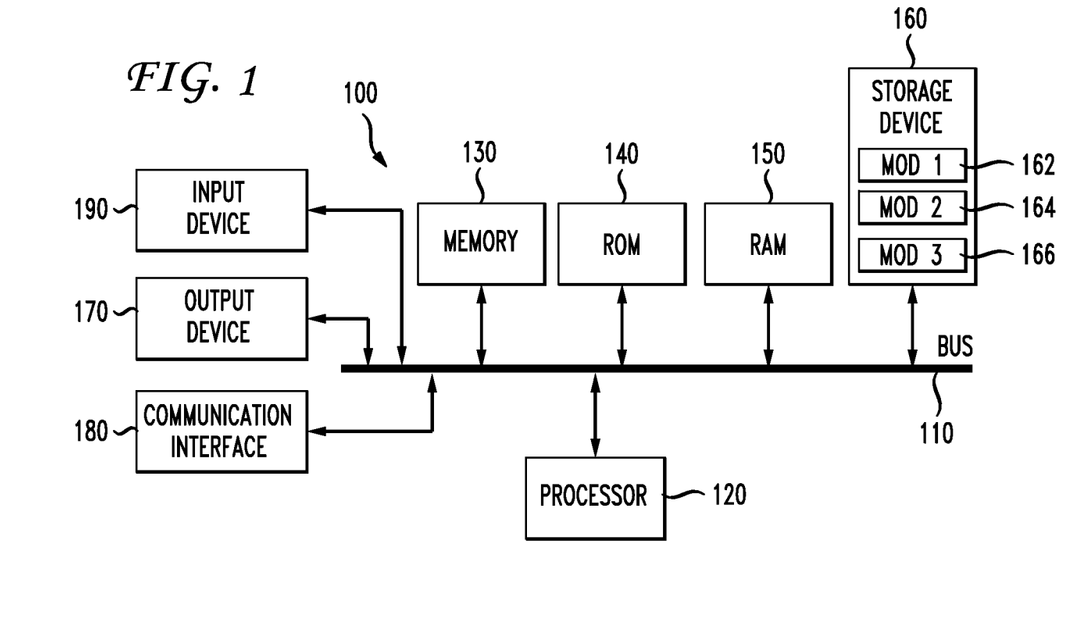
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
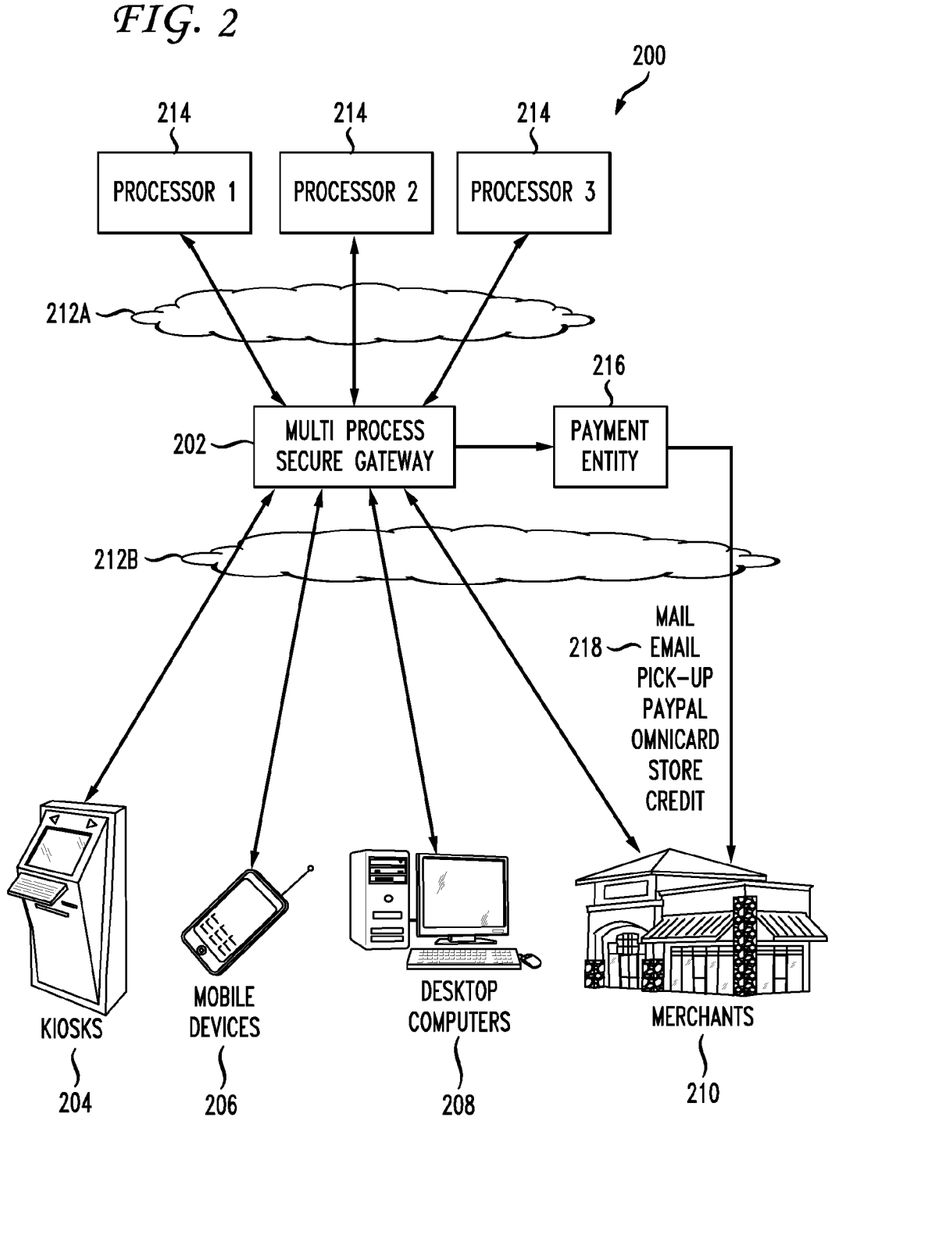
FIG. 2 illustrates a multi-process secure gateway configuration.

Having disclosed some components of a computing system, the disclosure now turns to a discussion of prepaid gift accounts, followed by a description of the exemplary multi-process secure gateway configuration shown in FIG. 2. A more detailed discussion of generating accounts for prepaid gifts will then follow.

Prepaid gift accounts are divided into open loop and closed loop prepaid gifts. Typically issuing banks or credit card companies issue open loop prepaid gift accounts (example: VISA, MASTERCARD, AMEX or DISCOVER) which can be redeemed by virtually any business entity. These differ from closed loop prepaid gift accounts which are typically issued by a specific store or restaurant and can be only redeemed by the issuing provider (example: SEARS, RED LOBSTER, TARGET). Prepaid gift accounts can be issued as open loop or closed loop physical cards or as an account number delivered (or the information associated with the account is delivered) to the prepaid account holder or to some other person or device via text message, email or as data displayed on an application residing on a mobile computing device such as a mobile telecommunications device, a mobile computing device such as a laptop computer, smart phone or tablet computer or a non-mobile computer device such as a personal computer system, personal gaming system or satellite or cable television system. Information associated with the accounts can be delivered in any fashion as noted above.

The disclosure now turns to FIG. 2, which illustrates a multi-process secure gateway configuration 200. The multi-process secure gateway 202 can be implemented as a local or remote server, a group of tightly or loosely interconnected servers, integrated as a software module within a point of sale device, or as any other suitable device, software, or combination thereof. In FIG. 2, the multi-process secure gateway 202 is shown as a single conceptual server available over a network 212B, such as the public telephone network or the Internet. The principles set forth herein can be applied to local area networks, wide area networks, virtual private networks, intranets, home networks, corporate networks, wireless ad-hoc networks, peer-to-peer networks, and virtually any other form of network.

The multi-process secure gateway 202 interacts with various requesters, such as kiosks 204, mobile devices 206, desktop computers 208, and merchants' point of sale devices 210, which submit information uniquely identifying prepaid gift accounts associated with prepaid gifts. Mobile device 206 also represents a standard telephone as well as communication with an interactive voice response system. Each of these devices can interact with the secure gateway 202 through different protocols, such as a direct network connection, an HTTP-based portal, SMS messages, telephone, interactive voice response systems, point-of-sale (POS) terminals, browsers, plug-ins, Secure Shell, File Transfer Protocol, Internet Protocol, Simple Mail Transfer Protocol, Telnet, etc.

In the case of merchants, each point of sale of the merchant 210 can connect to a centralized merchant server (not shown) which relays requests to the secure gateway 202 on behalf of all the merchant 210 point of sale devices. Other configurations also exist. In one aspect, this process may be called "Cash4Card" (name used for description purposes only). Merchants 210, kiosks 204, other devices and/or locations, including online storefronts, which provide an interface to the secure gateway 202 can provide an easily recognizable visual or other indication readily indicating to potential customers that they accept gift cards/codes under the Cash4Card program. The indication can be a window sticker, an online image, or other sign displayed in a manner similar to the well-known overlapping circles for MASTERCARD® or the blue and orange bars over and under the word VISA®.

The secure gateway 202 interacts with multiple closed loop processors 214, such as FIRSTDATA and CHASE PAYMENTECH, over a network 212A such as the Internet. These processors are entities that process prepaid gift account, such as FIRSTDATA, and are different from a computer processor such as an AMD PHENOM II or INTEL CORE DUO. The secure gateway 202 can perform any action on the prepaid gift account through the various prepaid gift account processors 214 as if the secure gateway 202 was a merchant. The secure gateway 202 analyzes the submitted information to determine which closed loop processor handles that type of prepaid gift account. For example, a particular series of numbers or letters can indicate that one prepaid gift account is honored by PAYMENTECH, and another distinct set of numbers or letters indicates that another closed loop card/code is honored by FIRSTDATA. The logic and analysis in the secure gateway 202 can change from time to time as new types of prepaid gift account are issued by existing prepaid gift account processors 214 or as the secure gateway 202 adds interfaces for new prepaid gift account processors. The secure gateway 202 can include a common application programmer interface (API) which defines actions which may be performed through the prepaid gift account processors 214. The API translates API calls to the corresponding specific sets of proprietary interactions with the various closed loop processors 214, which may be very different between prepaid gift account processors 214.

The secure gateway 202 determines the balance of the prepaid gift account from the prepaid gift account processor 214 and offers to purchase the prepaid gift account from the requestor, typically at a price lower than the face value of the prepaid gift account (though not always, and can be at or above the face value). If the requestor provides an indication of agreement to sell the prepaid gift account, then the secure gateway 202 deactivates the prepaid gift account associated with the submitted information, issues a new prepaid gift account in that amount, and pays the purchase price to the requestor through a payment entity 216. The gateway 202 can also provide instructions to other entities to perform the deactivation, issuance, payment, and other steps. The payment entity 216 can be part of the secure gateway 202, part of a merchant point of sale equipment 210, or a separate entity altogether.

The secure gateway 202 can provide additional instructions regarding how to transfer payment 218 to the requestor. Some examples of how to transfer payment include mailing a check to the requestor, paying cash to the requestor, mailing a new prepaid gift account issued as a physical card to the requestor, texting, emailing or displaying on an application on a mobile or non-mobile computing device to the requestor the necessary information to use a non-physical prepaid gift account (such as an account number and PIN), notifying a local financial service to prepare an amount of money for pickup (such as MONEYGRAM or WESTERN UNION), transferring funds to an electronic account (such as PAYPAL), paying a bill of the requestor, transferring money to a requestor's existing credit card or debit card or granting store credit to the requestor. The payment entity 216 can also provide payment to the requestor using other suitable approaches.

In one embodiment, the secure gateway 202 identifies an prepaid gift account associated with a prepaid gift and determines the balance of the account from the prepaid gift account processor 214. The secure gateway 202 then presents the owner of the prepaid gift account with an offer to purchase the prepaid gift account for an offer amount, which can be equal to the balance, below the balance, or above the balance. If the secure gateway 202 receives an acceptance of the offer from the owner, the secure gateway 202 provides payment to the owner of at least a portion of the amount in the prepaid gift account, generates a new prepaid gift account for a new prepaid gift, transfers funds from the account to the new prepaid gift account, deactivates the first prepaid gift account, and offers the new prepaid gift account for resale as a new prepaid gift. The money funding the new prepaid gift account does not need to directly come from the first prepaid gift account. For example, if a user has $100 in prepaid gift account for OLIVE GARDEN and desires to sell that prepaid gift account because they would prefer money, the system may pay the person $90 for the prepaid gift account from the first prepaid gift account or a separate account, then transfer a portion of the money from the first prepaid gift account to the new account and close down the original prepaid gift account such that the person cannot commit fraud by using the first prepaid gift account after being paid for the first prepaid gift account. Suppose that the new prepaid gift account now has $90 in it. The new prepaid gift associated with that new prepaid gift account can then be sold and it could be for OLIVE GARDEN, another business, or may be a general open loop prepaid gift account. The secure gateway 202 can offer the new prepaid gift account for resale to any other person. Moreover, the secure gateway 202 can provide payment via the payment entity 216.

Figure 3:
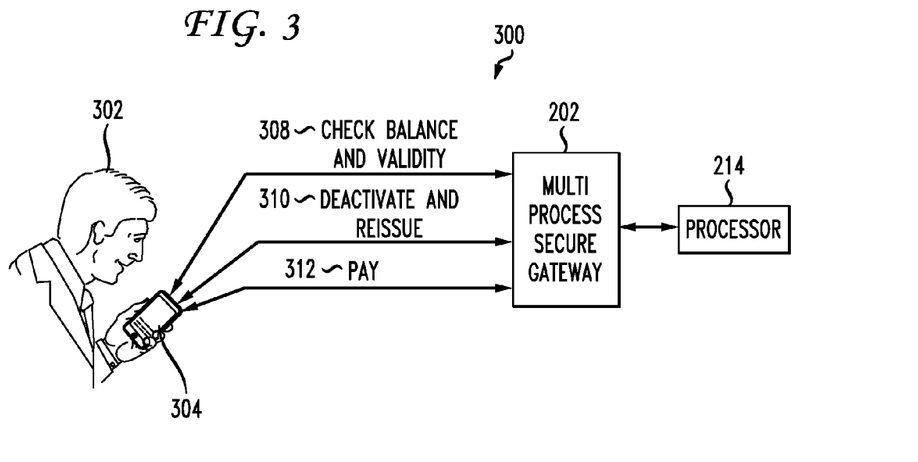
FIG. 3 illustrates a user interaction with a secure gateway.

FIG. 3 illustrates a user interaction with the secure gateway 202 as shown in FIG. 2. The user 302, through a network-enabled device 304, transmits a request to the multi-process secure gateway 202 to check the balance and validity of an identified prepaid gift account 308. The secure gateway 202 communicates with the appropriate processor 214 and returns the balance to the secure gateway 202. The secure gateway 202 makes a purchase price determination based on resale metrics of that particular type of prepaid gift account. Resale metrics can include how fast inventory of a particular type of prepaid gift account is resold, how much inventory is currently held, desired profit margins, operating expenses, fees to transfer or create new prepaid gift account, etc. The secure gateway 202 offers to purchase the prepaid gift account from the user 302 for the determined purchase price. If the user accepts, the secure gateway 202 provides payment 312 to the user 302. The secure gateway 202 also generates a new account for a new prepaid gift account, transfers funds from the prepaid gift account to the new prepaid gift account, and deactivates the prepaid gift account 310. The secure gateway 202 can then offer the new prepaid gift account for resale as a new prepaid gift account.

In one embodiment, the secure gateway 202 transfers the new prepaid gift account to a reseller. The reseller can offer to sell the new prepaid gift account for less than its face value. For example, if the user 302 submits a $200 SEARS gift prepaid gift account, the secure gateway 202 can determine that SEARS prepaid gift accounts in that denomination are in high demand and offer to purchase the $200 Sears prepaid gift account for $135. The user accepts the offer and the secure gateway 202 pays the user $135. The secure gateway 202 deactivates the $200 SEARS prepaid gift accountant reissues a new $200 SEARS prepaid gift account which can be represented as numbers stored by the reseller. The reseller then offers the $200 SEARS prepaid gift account for sale to the general public at a discount rate of $170, a 15% discount off the face value. When a customer purchases the $200 SEARS prepaid gift account, the reseller sell the new prepaid gift account as a physical card or as a physical plastic encoded card or as an account number (or information associated with the account number) delivered to the prepaid account holder (or another person or device) via text message, email or as data displayed on an application residing on a mobile computing device such as a mobile telecommunications device, a mobile computing device such as a laptop computer, smart phone or tablet computer or a non-mobile computer device such as a personal computer system, personal gaming system or satellite or cable television system. In this case, the reseller earns the difference between the purchase price $135 and the discount rate $170, or $35. The reseller can operate as a brick and mortar retail store, an online storefront, an online auction, or any other suitable sales outlet.

In another aspect, the reseller purchases a prepaid gift account from a user at or above its face value, i.e., purchases a $100 SEARS prepaid gift account for $100 or for $110. In this case, the reseller can make a profit by providing the payment for the prepaid gift account on a general purpose reloadable prepaid gift account run by the reseller. Then the reseller makes a profit from interest, float, interchange, and/or monthly minimum fees. The reseller method described herein may also be provided as a tool by another entity that franchises or receives a fee for use of the tool.

Figure 4:
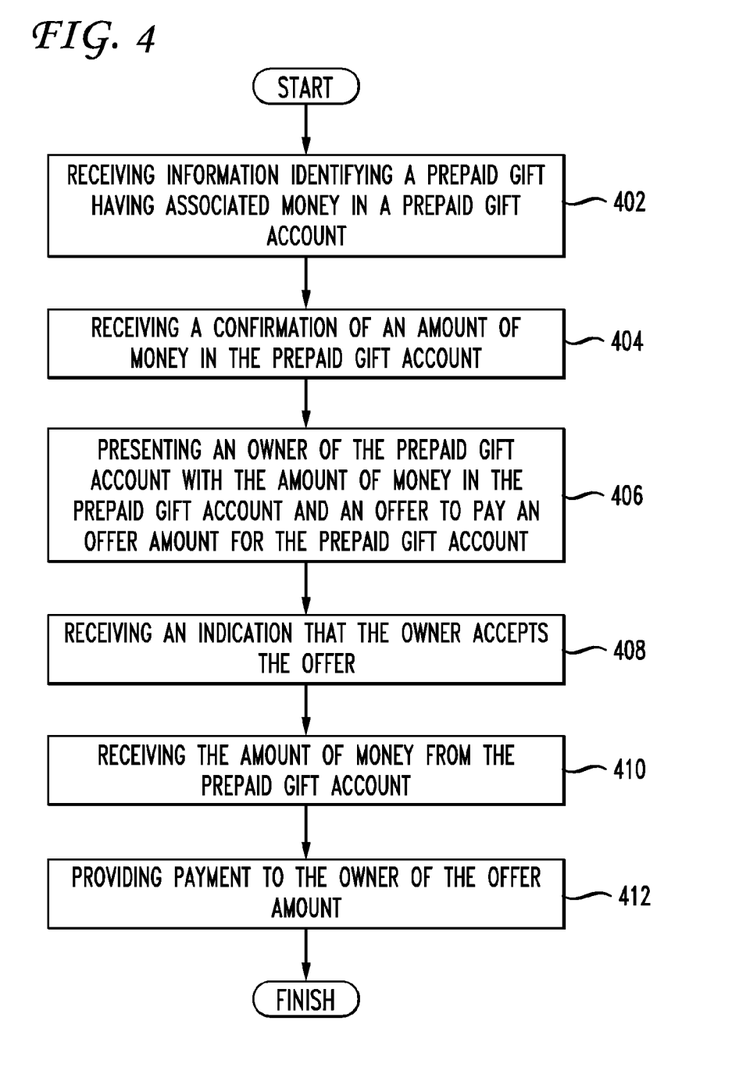
FIG. 4 illustrates an exemplary method for processing prepaid gift accounts.
Figure 5:
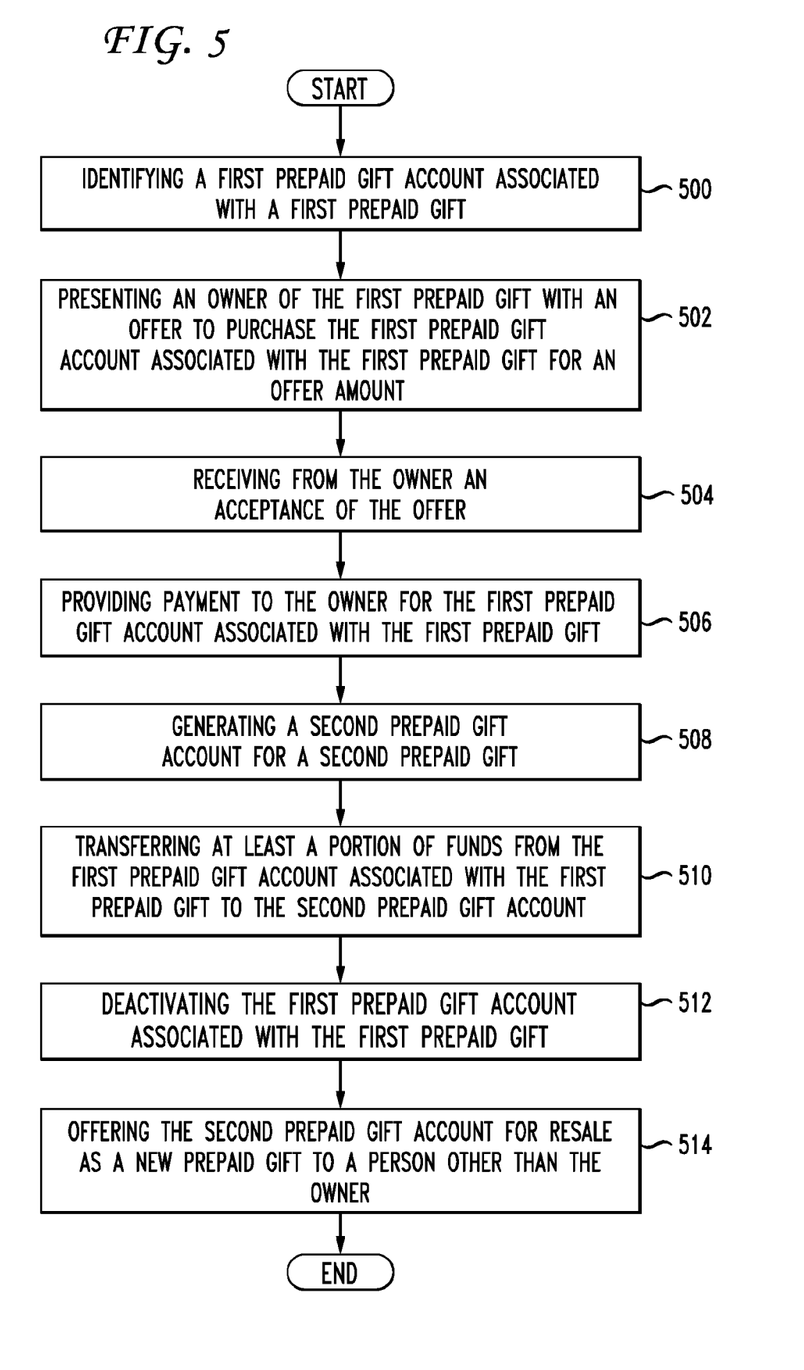
FIG. 5 illustrates an exemplary method for preventing fraud when exchanging prepaid gift accounts.

Having disclosed some basic system components and concepts, the disclosure now turns to the exemplary method embodiments shown in FIGS. 4 and 5. For the sake of clarity, the methods are discussed in terms of an exemplary system 100, as shown in FIG. 1, configured to practice the methods. The steps outlined herein are exemplary and can be implemented in any combination thereof, including combinations that exclude, add, or modify certain steps.

FIG. 4 illustrates an exemplary method for processing closed loop cards and codes. The method can be practiced by a system 100, as shown in FIG. 1, a compute cluster, a server farm, or any other multi node configuration. The system 100 first identifies a prepaid gift having associated money in a prepaid gift account (402). The owner of a prepaid gift account associated with a physical encoded card owner can swipe the physical card through a card reader to read information identifying the prepaid gift. The prepaid account owner can also insert the physical card into a physical card reader within a kiosk in a manner similar to an Automated Teller Machine (ATM). In one aspect, a kiosk or other location which accepts and/or reads physical card can include a recycling receptacle for collecting used physical cards. The collected used physical cards can be recycled or destroyed. Certain prepaid gift accounts issuers may require this feature to keep deactivated or invalid prepaid gift accounts out of circulation. The system 100 can restrict the amount of money the owner of the prepaid gift account can redeem over a period of time. The system 100 can also restrict the number of prepaid gift accounts redeemed over a period of time. For example, the system 100 can impose a $1,000 per month or 3 prepaid gift account per day limit. The system 100 can require the prepaid gift account owner to create or log in to an account to redeem prepaid gift accounts. The system 100 can also request that prepaid gift account owners enter driver's license information, social security number, credit card/code information, and/or any other information. This information can be used to direct payment to the owner and can also be used to check that the owner is not engaged in fraud with the closed loop prepaid gift accounts.

The system 100 receives a confirmation of an amount of money in the prepaid gift account (404). The system 100 can interact with a multi-process secure gateway, as shown in FIGS. 2 and 3, which communicates with one or more prepaid gift account processors to verify the prepaid gift account's validity and the amount in the prepaid gift account. The system 100 presents an owner of the prepaid gift account with the amount of money in the prepaid gift account and an offer to pay an offer amount for the prepaid gift account (406). For example, the system 100 can communicate to the user that the prepaid gift account has $100 and offer to purchase the prepaid gift account for $50. The offer amount can be based on a resale velocity of prepaid gift accounts of a similar type as the prepaid gift accounts, inventory levels, and/or any other relevant business metrics.

In a "stub hub" or auction-based model, the offer to pay the offer amount is time-limited and/or conditional upon a resale of the prepaid gift account. The prepaid gift account is effectively offered up on consignment, meaning that the system 100 provides payment to the owner of the offer amount upon resale to a third party. In this aspect, the system 100 can deactivate or suspend the prepaid gift account after the owner accepts the offer and reactivate or reinstate the prepaid gift account after the time-limited offer expires without resale. The system 100 can deactivate a prepaid gift account by simply withdrawing all the funds so that the prepaid gift account has a balance of $0.00. The system 100 can notify the prepaid gift account owner when a sale occurs, when payment is sent, etc. The system 100 can also notify the user that a time-limited consignment is expiring or expired. In this case, the system 100 can present the user with the option to end the consignment, resume the consignment, accept a lower offer price to promote a speedier sale, etc. The owner can set the system 100 to automatically renew the consignment for a number of time intervals or indefinitely.

The system 100 receives an indication that the owner accepts the offer (408) and receives the amount of money from the prepaid gift account (410). The system 100 can, at this point, generate a new prepaid gift account. The system 100 provides payment to the owner of the offer amount (412) in one or more of the payment methods set forth above. In one specific example, the system 100 pays the owner by adding value to a new or existing prepaid gift account. In another example, the system 100 receives from the owner a set of smaller values totaling a sum equal to or lesser than the amount of money in the prepaid gift accounts and divides the amount of money in the first prepaid gift account into new smaller prepaid gift accounts in denominations of the set of smaller values. The system 100 provides these new prepaid gift accounts to the owner as payment. A concrete example of this scenario is a user who submits a $300 prepaid gift account to BEST BUY, but does not want or need anything from BEST BUY or does not live sufficiently close to a BEST BUY. The user can sell the $300 prepaid gift account to the system 100 for $175, and split that $175 into open or closed loop prepaid gift accounts in varying denominations. The user can request a $100 closed loop prepaid gift account to TARGET, a $50 open loop prepaid gift account, and a $25 closed loop prepaid gift account to TOYS "Я" US. The user can then regive these prepaid gift accounts to others. The user can request that the system 100 deliver the prepaid gift account (or information associated with or identifying the account or the existence of the account) to a third party as a gift. For example, Abe sells a closed loop prepaid gift account for a prepaid gift account to WAL-MART. Abe can request that the system 100 send the prepaid gift account to Betty, his wife, as an anniversary present. Users can request that the system hold the prepaid gift account and deliver it (or data about the account) on a specific day to a specific person. Users can further provide a personalized message for delivery with the prepaid gift account. In one aspect, the system 100 provides users with a management interface to edit details of held prepaid gift account, such as cancelling the hold, delivering early, editing the personalized message, and other management functions.

The system 100 can provide a mechanism for applying funds on an unwanted prepaid gift account toward payments of a bill (utility bill, car loan, student loan payment, cell phone bill, etc.). As an example, Tom presents a $50 SEARS prepaid gift account to a Cash4Card site, which offers Tom $40 for the prepaid gift account. Tom elects to receive the $40 by way of entering the Third Party they wish to pay the funds to, and the Cash4Card site makes payment on Tom's behalf. The Cash4Card site can then prompt Tom to enter additional information, such as an account number, invoice number, or bill number.

In another variation, the owner had a $100 prepaid gift account and purchased merchandise with it such that $32.31 remained on the prepaid gift account. The system 100 offers to purchase the $32.31 prepaid gift account for $19.39. The owner wants to use the offered purchase price as a prepaid gift account, but doesn't want to give a prepaid gift with a non-round number. The user can pay extra money in addition to the offered purchase price to obtain a prepaid gift account with the desired round number, such as an extra $0.61 to round up to $20 or an extra $5.61 to round up to $25.

In one aspect, the system 100 offers for sale the new prepaid gift account at a second offer amount and, upon a user accepting the second offer for sale and upon receiving payment, generates and transfers the new prepaid gift account to the user. The user can request that the new prepaid gift account be personalized based on input text, data, images, sounds, or other information.

FIG. 5 illustrates an exemplary method for preventing fraud when exchanging prepaid gift accounts. The method can be practiced, for example, by a system 100, as shown in FIG. 1, a compute cluster, a server farm, or any other multi node configuration. The method can prevent fraud when users exchange prepaid gift accounts by closing a first prepaid gift account and generating a second prepaid gift account that is funded with at least a portion of the funds from the first prepaid gift account.

First, the system 100 identifies a first prepaid gift account associated with a first prepaid gift (500). The system 100 can identify the first prepaid gift account based on a password, a security code, a passphrase, a number/symbol, a bar code, an identifier, a description, account data, account characteristics, information associated with an owner, merchant information, etc. The system 100 can check that the owner of the first prepaid gift account is not engaged in fraud with the first prepaid gift account and gather personal information, such as a driver's license number or credit card/code number. The information used to identify the first prepaid gift account and/or check for fraud can be provided by, or obtained from, a user, a device, a merchant, a file, a program, a prepaid gift account encoded onto a physical card, a network, etc. For example, the system 100 can require the user to provide relevant information.

Further, the system 100 can read information identifying the prepaid gift account from a physical card. The prepaid gift account owner can swipe the physical card through a card reader so the system 100 can read the information identifying the prepaid gift account. The physical card reader can be part of the system 100 or a separate system. For instance, the physical card reader can be a remote device which communicates with the system 100 via a network. The prepaid gift account owner can also insert the physical card into a card reader within a kiosk in a manner similar to an Automated Teller Machine (ATM). In one aspect, a kiosk or other location which accepts and/or reads physical cards can include a recycling receptacle for collecting used physical cards. The collected used physical cards can be recycled or destroyed. Certain prepaid gift account issuers may require this feature to keep deactivated or invalid prepaid gift accounts out of circulation. The prepaid gift account owner can also enter the account number associated with the prepaid gift account into a POS terminal, an application on a mobile computing device or personal computer which transmits the account number to the system via the network.

The system 100 can also receive a confirmation of an amount of money in the prepaid gift account. Receiving a confirmation can include interacting with a multi-process secure gateway which communicates with one or more prepaid gift account processors. For example, the system 100 can interact with a multi-process secure gateway, as shown in FIGS. 2 and 3, which communicates with one or more prepaid gift account processors to verify the prepaid gift account's validity and the amount in the prepaid gift account.

Then, the system 100 presents an owner of the first prepaid gift with an offer to purchase the first prepaid gift account associated with the first prepaid gift for an offer amount (502). The system 100 can present the owner of the first prepaid gift account with an offer to pay an amount of money for the first prepaid gift account. For example, the system 100 can communicate to the owner that the first prepaid gift account has $100 and offer to purchase the first prepaid gift account for $50. The offer amount can be based on a prepaid gift account balance, an account type, a risk, an estimated value, a contract, a feature, an interest, a transaction history, an identity associated with a party involved in the transaction, a term, and so forth. The offer amount can also be based on a resale velocity of prepaid gift accounts of a similar type as the prepaid gift accounts, inventory levels, and/or any other relevant business metrics.

Moreover, the offer to purchase the prepaid gift account can be time-limited and conditioned upon a resale of a different prepaid gift account, which can be a new prepaid gift account based from the prepaid gift account associated with the offer. In this variation, the system 100 provides payment to the owner for the prepaid gift account only after the resale. Here, the system 100 can deactivate the first prepaid gift account after the owner accepts the offer and, if the new prepaid gift account does not sell, reactivate the first prepaid gift account associated with the offer. The system 100 can reactivate the first prepaid gift account after the time-limited offer expires without resale.

In a "stub hub" or auction-based model, the offer to pay the offer amount is time-limited and/or conditional upon a resale of the first prepaid gift account. The prepaid gift account is effectively offered up on consignment, meaning that the system 100 provides payment to the owner of the offer amount upon resale to a third party. In this aspect, the system 100 can deactivate or suspend the first prepaid gift account after the owner accepts the offer and reactivate or reinstate the first prepaid gift account after the time-limited offer expires without resale. The system 100 can deactivate the first prepaid gift account by simply withdrawing all the funds so that the first prepaid gift account has a balance of $0.00. The system 100 can notify the first prepaid gift account owner when a sale occurs, when payment is sent, etc. The system 100 can also notify the user that a time-limited consignment is expiring or expired. In this case, the system 100 can present the user with the option to end the consignment, resume the consignment, accept a lower offer price to promote a speedier sale, etc. The owner can set the system 100 to automatically renew the consignment for a number of time intervals or indefinitely.

Next, the system 100 receives from the owner an acceptance of the offer (504) and, based on the acceptance, provides payment to the owner for the first prepaid gift account associated with the first prepaid gift (506). In one embodiment, the system 100 receives a counteroffer from the owner and, based on the counteroffer, provides payment to the owner for the first prepaid gift account associated with the first prepaid gift. The payment can include a check, a payment of a bill or debt of the owner, loading an amount to a new or existing credit, a debit card or prepaid gift, a deposit into an existing or new bank account, cash, etc. Further, the payment can be provided as value added to an open and/or closed loop prepaid gift account. In one embodiment, the system 100 receives an amount of money from the owner and provides payment to the owner by providing a new prepaid gift account to the owner plus the additional amount of money.

Based on the acceptance, the system 100 also generates a second prepaid gift account for a second prepaid gift (508) and transfers at least a portion of funds from the first prepaid gift account associated with the first prepaid gift to the second prepaid gift account (510). The portion of funds transferred from the first prepaid gift account associated with the first prepaid gift to the new prepaid gift account can be the full portion of funds in the first prepaid gift account or any amount of the funds in the first prepaid gift account. In addition to the portion of funds transferred from the first prepaid gift account associated with the first prepaid gift, the system 100 can transfer additional funds from another source and/or prepaid gift account. Moreover, the money funding the second prepaid gift account does not have to directly come from the first prepaid gift account. For example, if a user has $100 in a prepaid gift account for OLIVE GARDEN and desires to sell that prepaid gift account because they would prefer money, the system 100 can pay the person $90 for the prepaid gift account from the first prepaid gift account and/or a separate account, then transfer a portion of the money from the first prepaid gift account to the second prepaid gift account and close down the first prepaid gift account such that the person cannot commit fraud by using the first prepaid gift account after being paid for the first prepaid gift account. Suppose that the second prepaid gift account now has $90 in it. The second prepaid gift account can then be sold, and the second prepaid gift account can be for OLIVE GARDEN, another business, or may be a general open loop prepaid gift account.

The second prepaid gift account can be a closed loop or open loop gift card, for example. The prepaid gift account can be issued as a physical card or as an account number delivered to the prepaid account holder via text message, email or as data displayed on an application residing on a mobile computing device such as a mobile telecommunications device, a mobile computing device such as a laptop computer, smart phone or tablet computer or a non-mobile computer device such as a personal computer system, personal gaming system or satellite or cable television system.

After transferring funds to the second prepaid gift account, the system 100 can also receive a confirmation of an amount of money in the second prepaid gift account. Receiving a confirmation can include interacting with a multi-process secure gateway which communicates with one or more account processors. For example, the system 100 can interact with a multi-process secure gateway, as shown in FIGS. 2 and 3, which communicates with one or more account processors to verify the prepaid gift account's validity and the amount in the prepaid gift account.

The system 100 then deactivates the first prepaid gift account associated with the first prepaid gift (512). The system 100 deactivates the first prepaid gift account to prevent fraud and protect the parties involved in the exchange and/or any party having an interest in the transaction. The system 100 can deactivate the first prepaid gift account by closing the first prepaid gift account and/or withdrawing the funds from the first prepaid gift account. The system 100 can also deactivate the first prepaid gift account by suspending the first prepaid gift account and/or implementing a restriction. The first prepaid gift account deactivation can be triggered by an event, such as a confirmation, an acceptance, a counteroffer, a connection, an input, an output, an alert, a security threat, a payment, a promise, an exchange, an error, a request, fraudulent activity, and so forth. The first prepaid gift account deactivation can also be based on a schedule, a parameter, a threshold, a status, a condition, a setting, a rule, a security risk, and so forth.

Finally, the system 100 offers the second prepaid gift account for resale as a new prepaid gift to a person other than the owner (514). The system 100 can also offer for sale the second prepaid gift account at a specific offer amount, and, upon receiving a payment or acceptance from a second user, transfer the second prepaid gift account to the second user. The second prepaid gift account can be personalized based on input from the second user.

In one embodiment, the system 100 auctions the second prepaid gift account for resale as a new prepaid gift to the highest bidder. In another embodiment, the system 100 divides the first prepaid gift account associated with the first prepaid gift into multiple prepaid gift accounts and offers the multiple prepaid gift accounts for resale as new prepaid gifts. For example, the system 100 can generate new prepaid gift accounts for multiple, new prepaid gifts, transfer a portion of funds from the first prepaid gift account associated with the first prepaid gift to the new prepaid gift accounts, deactivate the first prepaid gift account associated with the first prepaid gift, and offer the new prepaid gift accounts for resale as new prepaid gifts. The system 100 can also divide a prepaid gift account into prepaid gift accounts in denominations of a set of smaller values, deactivate the prepaid gift account, and offer the new prepaid gift accounts for resale. Here, the system 100 can provide one or more of the prepaid gift accounts to the owner as payment and/or offer one or more of the prepaid gift accounts for resale as new prepaid gift accounts. The system 100 can also take funds from multiple prepaid gift accounts, combine them into a new larger prepaid gift account, deactivate the multiple prepaid gift accounts, and offer the new larger prepaid gift account for resale.

Furthermore, the system 100 can restrict the amount of money the owner of the prepaid gift account can redeem over a period of time. The system 100 can also restrict the number of prepaid gift accounts redeemed over a period of time. For example, the system 100 can impose a $1,000 per month or 3 prepaid gift account per day limit. Moreover, the system 100 can require the prepaid gift account owner to create or log in to a prepaid gift account to redeem prepaid gift accounts. The system 100 can also request that prepaid gift account owners enter driver's license information, social security number, credit card/code information, and/or any other information. This information can be used to direct payment to the owner and/or check that the owner is not engaged in fraud with the prepaid gift account. In a related variation, the system 100 can check that the owner is not engaged—or has engaged—in fraud with the prepaid gift account and gather personal information, such as a driver's license number, address, social security number and/or credit card/prepaid gift account information. If the system 100 determines that the owner is engaged or has engaged in fraud, it can deactivate the prepaid gift account and/or refuse the transaction. The system 100 can also monitor, restrict, and/or blacklist the owner if the system 100 finds suspicious activity at any time.

The system 100 can notify the owner when an acceptance is received, a payment is sent, a new prepaid gift account is generated, funds are transferred, the first prepaid gift account is deactivated, a sale occurs, a confirmation is received, fraudulent activity is detected, a restriction is encountered, an expiration is approaching or has been exceeded, etc. The system 100 can also provide similar notifications to a merchant and/or any other interested party. For example, the system 100 can generate an alert to the merchant and/or a law enforcement entity if it detects fraudulent activity.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A method comprising:
providing, via a processor, payment to an owner for a first prepaid gift account associated with a first prepaid gift;
generating a second prepaid gift account for a second prepaid gift;
transferring at least a portion of funds from the first prepaid gift account to the second prepaid gift account;
deactivating the first prepaid gift account; and
offering the second prepaid gift account for resale as a new prepaid gift to a person other than the owner.

2. The method of claim 1, further comprising:
presenting the owner of the first prepaid gift with an offer to purchase the first prepaid gift account associated with the first prepaid gift; and
receiving from the owner an acceptance of the offer, wherein the steps of claim 1 are performed based on the acceptance.

3. The method of claim 1, wherein the second prepaid gift account is one of a closed loop gift code and open loop, and wherein information associated with the second prepaid gift account is delivered via electronic means and independent of a physical gift instrument.

4. The method of claim 1, wherein the second prepaid gift account is one of a closed loop and an open loop, and wherein information associated with the second prepaid gift account is delivered on a paper medium.

5. The method of claim 1, wherein the second prepaid gift account is one of a closed loop and an open loop, and wherein information associated with the second prepaid gift account is delivered via a bar code.

6. The method of claim 1, wherein the second prepaid gift account is one of a closed loop and an open loop, and wherein information associated with the second prepaid gift account is delivered via one of an application on a mobile telecommunications device, a mobile computing device, a personal computer, a gaming system, a satellite, and a cable television system.

7. The method of claim 1, wherein the second prepaid gift account is one of a closed loop and an open loop, and wherein information associated with the second prepaid gift account is delivered encoded on a physical card.

8. The method of claim 1, wherein payment to the owner for the first prepaid gift account is at least one of cash, a check, a payment of a bill or debt of the owner, loading an amount to an existing credit, loading an amount to a new credit account, a debit card, a prepaid gift, a deposit into to an existing bank account, and a deposit into to a new bank account.

9. The method of claim 1, wherein the second prepaid gift account is one of a closed loop and an open loop, wherein information associated with the second prepaid gift account is delivered via a text message.

10. The method of claim 1, wherein the second prepaid gift account is one of a closed loop and an open loop, wherein information associated with the second prepaid gift account is delivered via an electronic mail message.

11. A system comprising:
a processor; and
a non-transitory memory storing instructions which, when executed by the processor, cause the processor to perform a method comprising:
 based on a counter off from an owner of a first prepaid gift account associated with a first gift, the counter offer being in response to an offer to purchase the first prepaid gift account;
 providing payment to the owner for the first prepaid gift account associated with the first prepaid gift, the payment comprising one of money and a new prepaid gift account associated with a new prepaid gift;
 generating a second prepaid gift account associated with a second prepaid gift;
 transferring at least a portion of funds from the first prepaid gift account to the second prepaid gift account;
 deactivating the first prepaid gift account associated with the first prepaid gift; and
 offering the second prepaid gift account for resale as a resale prepaid gift to a person other than the owner.

12. The method of claim 11, further comprising:
presenting the owner of the first prepaid gift account with an offer to purchase the first prepaid gift account for an offer amount; and
receiving from the owner the counteroffer.

13. The system of claim 11, wherein the second prepaid gift account is one of a closed loop gift code and open loop, and wherein information associated with the second prepaid gift account is delivered via electronic means and independent of a physical gift instrument.

14. The system of claim 11, wherein the second prepaid gift account is one of a closed loop and an open loop, and wherein information associated with the second prepaid gift account is delivered on a paper medium.

15. The system of claim 11, wherein the second prepaid gift account is one of a closed loop and an open loop, and wherein information associated with the second prepaid gift account is delivered via a bar code.

16. The system of claim 11, wherein the second prepaid gift account is one of a closed loop and an open loop, and wherein information associated with the second prepaid gift account is delivered via one of an application on a mobile telecommunications device, a mobile computing device, a personal computer, a gaming system, a satellite, and a cable television system.

17. The system of claim 11, wherein the second prepaid gift account is one of a closed loop and an open loop, and wherein information associated with the second prepaid gift account is delivered encoded on a physical card.

18. The system of claim 11, wherein the second prepaid gift account is one of a closed loop and an open loop, and wherein information associated with the second prepaid gift account is delivered via a text message.

19. The system of claim 11, wherein the second prepaid gift account is one of a closed loop and an open loop, wherein information associated with the second prepaid gift account is delivered via an electronic mail message.

20. A computer-readable storage device having stored therein instructions which, when executed by a processor, cause the processor to perform operations comprising:
 providing payment to an owner for a first prepaid gift account associated with a first prepaid gift;
 generating a second prepaid gift account for a second prepaid gift;
 transferring at least a portion of funds from the first prepaid gift account to the second prepaid gift account;
 deactivating the first prepaid gift account; and
 offering the second prepaid gift account for resale as a new prepaid gift to a person other than the owner.

* * * * *